(12) United States Patent
Jimenez-Huyke et al.

(10) Patent No.: US 8,197,564 B2
(45) Date of Patent: Jun. 12, 2012

(54) METHOD AND APPARATUS FOR COOLING SYNGAS WITHIN A GASIFIER SYSTEM

(75) Inventors: Allyson Joy Jimenez-Huyke, Houston, TX (US); James Michael Storey, Houston, TX (US); John Saunders Stevenson, Yorba Linda, CA (US); Aaron John Avagliano, Houston, TX (US); Thomas Frederick Leininger, Chino Hills, CA (US); Judeth Brannon Corry, Manvel, TX (US)

(73) Assignee: General Electric Company, Schenectady, NY (US)

( * ) Notice: Subject to any disclaimer, the term of this patent is extended or adjusted under 35 U.S.C. 154(b) by 1154 days.

(21) Appl. No.: 12/030,698

(22) Filed: Feb. 13, 2008

(65) Prior Publication Data

US 2009/0202403 A1   Aug. 13, 2009

(51) Int. Cl.
*C10J 3/72* (2006.01)
(52) U.S. Cl. ............................ 48/69; 48/197 R; 422/207
(58) Field of Classification Search .......... 48/62 R–62 A
See application file for complete search history.

(56) References Cited

U.S. PATENT DOCUMENTS

| 4,054,424 | A | | 10/1977 | Staudinger et al. | |
|---|---|---|---|---|---|
| 4,520,760 | A | | 6/1985 | Covell | |
| 4,705,542 | A | * | 11/1987 | Gilmer | 95/210 |
| 4,778,483 | A | | 10/1988 | Martin et al. | |
| 4,801,307 | A | | 1/1989 | Muenger et al. | |
| 5,233,943 | A | | 8/1993 | Martin et al. | |
| 5,713,312 | A | * | 2/1998 | Waryasz | 122/481 |
| 2008/0042373 | A1 | * | 2/2008 | Wilson et al. | 277/631 |
| 2008/0175769 | A1 | * | 7/2008 | Goller et al. | 422/201 |
| 2009/0166975 | A1 | * | 7/2009 | Russell et al. | 277/312 |

* cited by examiner

*Primary Examiner* — Imran Akram
(74) *Attorney, Agent, or Firm* — Armstrong Teasdale LLP

(57) ABSTRACT

A method of assembling a synthesis gas (syngas) cooler for a gasification system includes positioning a dip tube within a shell of the syngas cooler. The dip tube is configured to quench the syngas flowing through the shell and/or at least partially channel the syngas through the dip tube. The method also includes coupling an isolation tube to the dip tube such that the isolation tube is substantially concentrically aligned with, and radially outward of, the dip tube. The isolation tube is coupled in flow communication with a purge gas source and is configured to at least partially form a dynamic pressure seal. The method further includes coupling at least one of the isolation tube and the dip tube in fluid communication with a fluid retention chamber. The method also include at least partially filling the fluid retention chamber with fluid, thereby further forming the dynamic pressure seal.

18 Claims, 3 Drawing Sheets

METHOD AND APPARATUS FOR COOLING SYNGAS WITHIN A GASIFIER SYSTEM

BACKGROUND OF THE INVENTION

This invention relates generally to synthesis gas, or syngas, coolers for use in a gasifier system, and, more specifically, to a quench system for use with a syngas cooler.

Some known gasification systems use two syngas coolers in series to cool syngas, slag, and fly ash particles contained therein. Such systems can be used advantageously because, typically, a first syngas cooler, typically a radiant syngas cooler, or RSC, incorporates slag and fly ash separation and quenching means near a first syngas outlet that facilitates reducing the potential of fouling and plugging in a second syngas cooler. Fouling and plugging is a concern associated with the second syngas cooler, typically a convective syngas cooler, or CSC, due to changes in heat transfer surface materials and configurations that are used to effectively transfer heat, as well as changing flow conditions. Such a series cooler arrangement facilitates heat transfer efficiency, however, a large capital investment in such a two syngas cooler arrangement may not always be cost-effective. Furthermore, under certain circumstances, such an arrangement may not effectively mitigate fouling and plugging.

Some other known gasification systems use a first syngas cooler similar to that described above, but unlike the arrangement described above, exclude the second syngas cooler, wherein an internal quench mechanism is incorporated near the outlet of the first syngas cooler. Although not providing the same degree of heat recovery as described above, a single cooler system can decrease capital costs, facilitate downstream applications of the syngas that requires moisture in the syngas, while also mitigating fouling and plugging. However, incorporating an effective quench arrangement with a syngas outlet presents challenges, including how best to facilitate the quenching operation, while mitigating corrosion as well as sealing and controlling a differential pressure across portions of the syngas cooler heat transfer surfaces normally associated with such systems.

BRIEF DESCRIPTION OF THE INVENTION

In one aspect, a method of assembling a synthesis gas (syngas) cooler for a gasification system is provided. The method includes positioning a dip tube within a shell of the syngas cooler. The dip tube is configured to at least one of at least partially quench at least a portion of the syngas flowing through the shell and at least partially channel at least a portion of the syngas through the dip tube. The method also includes coupling an isolation tube to the dip tube such that the isolation tube is substantially concentrically aligned with, and radially outward of, the dip tube. The isolation tube is coupled in flow communication with a purge gas source and is configured to at least partially form a dynamic pressure seal. The method further includes coupling at least one of the isolation tube and the dip tube in fluid communication with a fluid retention chamber. The method also includes at least partially filling the fluid retention chamber with fluid, thereby further forming the dynamic pressure seal.

In a further aspect, a synthesis gas (syngas) cooler for use within a gasification system is provided. The syngas cooler includes a shell and a dip tube coupled within the shell. The dip tube is configured to at least partially quench at least a portion of a syngas flowing through the shell and/or at least partially channel a portion of the syngas through the dip tube. The syngas cooler also includes an isolation tube coupled to the dip tube such that the isolation tube is substantially concentrically aligned with, and radially outward of, the dip tube. The isolation tube is coupled in flow communication with a purge gas source and is configured to at least partially form a dynamic pressure seal. The syngas cooler further includes a fluid retention chamber coupled in flow communication with at least one of the isolation tube and the dip tube. The fluid retention chamber is at least partially filled with fluid and is configured to further form the dynamic pressure seal.

In another aspect, a gasification system is provided. The gasification system includes at least one gasifier configured to produce a synthesis gas (syngas). The system also includes at least one syngas cooler coupled in flow communication with the gasifier. The syngas cooler includes a shell and a dip tube coupled within the shell. The dip tube is configured to at least partially quench at least a portion of a syngas flowing through the shell and/or at least partially channel a portion of the syngas through the dip tube. The syngas cooler also includes an isolation tube coupled to the dip tube such that the isolation tube is substantially concentrically aligned with, and radially outward of, the dip tube. The isolation tube is coupled in flow communication with a purge gas source and is configured to at least partially form a dynamic pressure seal. The syngas cooler further includes a fluid retention chamber coupled in flow communication with at least one of the isolation tube and the dip tube. The fluid retention chamber is at least partially filled with fluid and is configured to further form the dynamic pressure seal.

DETAILED DESCRIPTION OF THE INVENTION

Figure 1:
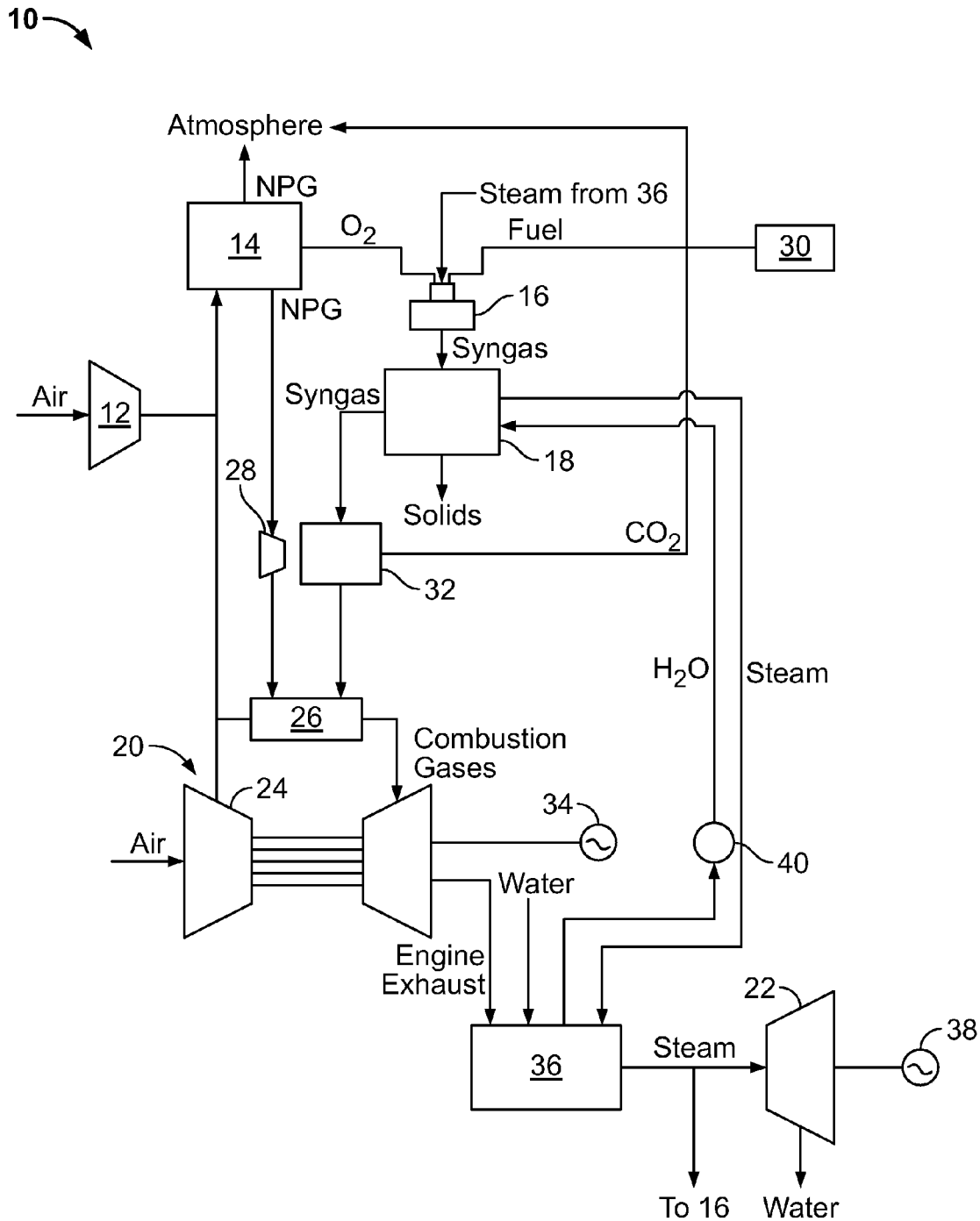
FIG. 1 is schematic view of an exemplary integrated gasification combined cycle power generation system.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication with syngas cooler 18, and a steam turbine engine 22 coupled in flow communication with syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas". The $O_2$ flow is channeled to gasifier 16 for use in generating synthesis gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at least some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a NPG compressor 28 for compressing the nitrogen process gas flow before being injected into a combustion zone (not shown) of gas turbine engine combustor 26.

In the exemplary embodiment, gasifier 16 converts a mixture of fuel supplied from a fuel supply 30, $O_2$ supplied by ASU 14, steam, and/or liquid water, and/or slag additive into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, syngas generated by gasifier 16 includes carbon monoxide, hydrogen, and carbon dioxide. In the exemplary embodiment, gasifier 16 is an entrained flow gasifier, configured to discharge syngas, slag, and fly ash vertically downward into syngas cooler 18. Alternatively, gasifier 16 may be any type and configuration that facilitates operation of syngas cooler 18 as described herein.

In the exemplary embodiment, syngas generated by gasifier 16 is channeled to syngas cooler 18 to facilitate cooling the syngas, as described in more detail below. The cooled syngas is channeled from cooler 18 to a clean-up device 32 that facilitates cleaning the syngas before it is channeled to gas turbine engine combustor 26 for combustion therein. Carbon dioxide ($CO_2$) may be separated from the syngas during clean-up and, in the exemplary embodiment, may be vented to the atmosphere. Gas turbine engine 20 drives a first generator 34 that supplies electrical power to a power grid (not shown). Exhaust gases from gas turbine engine 20 are channeled to a heat recovery steam generator (HRSG) 36 that generates steam for driving steam turbine 22. Power generated by steam turbine 22 drives a second generator 38 that also provides electrical power to the power grid. In the exemplary embodiment, steam from heat recovery steam generator 36 may be supplied to gasifier 16 for generating syngas.

Furthermore, in the exemplary embodiment, system 10 includes a pump 40 that supplies heated water from HRSG 36 to syngas cooler 18 to facilitate cooling syngas channeled from gasifier 16. The heated water is channeled through syngas cooler 18 wherein water is converted to steam. Steam from cooler 18 is then returned to HRSG 36 for use within gasifier 16, syngas cooler 18, and/or steam turbine 22.

Figure 2:
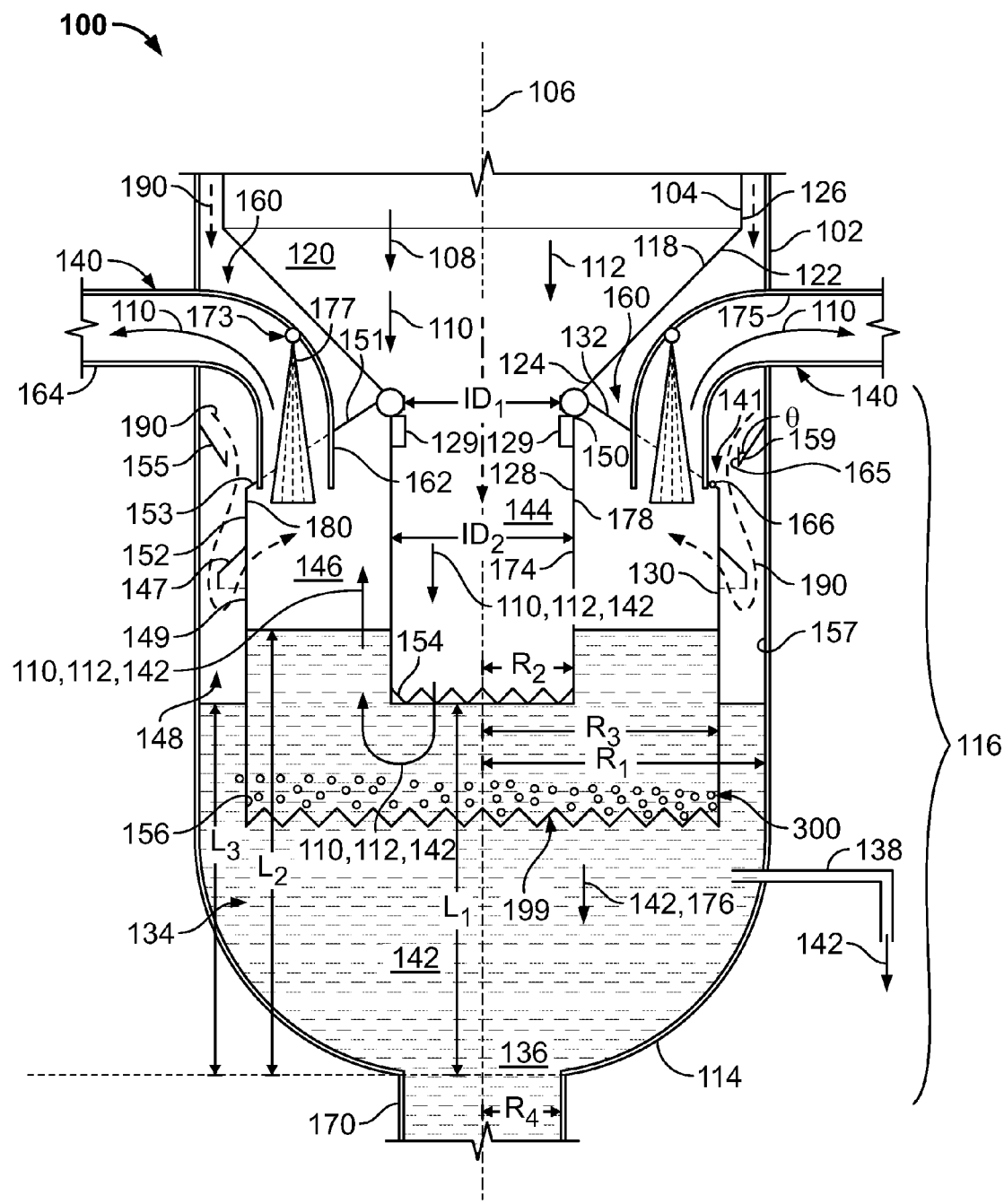
FIG. 2 is a schematic cross-sectional view of an exemplary syngas cooler that may be used with the system shown in FIG. 1.

FIG. 2 is a schematic cross-sectional view of a lower portion of an exemplary syngas cooler 100 that may be used with system 10 (shown in FIG. 1). Syngas cooler 100 is an exemplary embodiment of syngas cooler 18 (shown in FIG. 1) and is a radiant syngas cooler (RSC). Syngas cooler 100 includes a plurality of heat exchange devices, such as, but not being limited to, a heat exchange wall 104 and/or platen assemblies (not shown), positioned within a cooler shell 102. In the exemplary embodiment, heat exchange wall 104 substantially isolates shell 102 from syngas 110 flowing through cooler 100. Also, in the exemplary embodiment, shell 102 has a substantially circular cross-sectional shape having a longitudinal axis, or centerline 106 and a shell radius $R_1$. Alternatively, shell 102 may have any cross-sectional shape that facilitates operation of cooler 100 as described herein. Radii, as described herein, are measured outward from centerline 106 unless otherwise defined. A main syngas flowpath 108 is defined within cooler 100 along which syngas 110 and/or particulates 112 generally flow. In some embodiments, shell 102 and wall 104 are fabricated from any material that facilitates preventing syngas 110 and particulate material 112 from substantially adhering to shell 102 and wall 104.

In the exemplary embodiment, flowpath 108 is generally aligned parallel with centerline 106. Although syngas 110 and particulates 112 are shown as separate flows, it will be understood that particulates 112 may be entrained with and/or suspended within syngas 110 such that particulates 112 and syngas 110 constitute a combined flow. Furthermore, as used herein, the terms "upstream" and "downstream" are defined with respect to main syngas flowpath 108, such that a top (not shown) of cooler 100 is considered to be "upstream" from a bottom 114 of cooler 100. Also, as used herein, particulates 112 is defined to include molten ash particulates, char, and fly ash particulates.

Cooler 100 also includes a quench chamber 116 that is downstream from the heat exchange devices. Chamber 116 facilitates rapidly cooling syngas 110 and/or particulates 112. More specifically, a lower wall 118 separates quench chamber 116 from a heat exchange section 120 of cooler 100 including the heat exchange devices (as described above) therein. In one embodiment, lower wall 118 is formed from a plurality of heat exchange tubes (not shown). In another embodiment, lower wall 118 is fabricated from a refractory liner material. Moreover, in some embodiments, quench chamber 116 and lower wall 118 are fabricated from any material that facilitates preventing syngas 110 and particulate material 112 from substantially adhering to quench chamber 116 and lower wall 118. In the exemplary embodiment, lower wall 118 is substantially conical and tapers inwardly, or converges from an upstream end 122 of lower wall 118 to a downstream end 124 of lower wall 118. Downstream end 124 defines a first inner diameter $ID_1$. Moreover, upstream end 122 may be coupled to, and/or positioned adjacent to, a downstream end 126 of heat exchange wall 104. Alternatively, lower wall 118 may be coupled to any other suitable component within syngas cooler 100 that facilitates operation of cooler 100 as described herein.

In the exemplary embodiment, quench chamber 116 includes a dip tube 128, a quench ring 129 and/or quench spray devices (not shown), an isolation tube 130, a splash plate 132, a fluid retention chamber, or water bath 134, a sump 136, a blowdown line 138, a water bath fluid makeup supply line (not shown) and at least one syngas outlet 140. In some embodiments, dip tube 128 and isolation tube 130 are fabricated from any material that facilitates preventing syngas 110 and particulate material 112 from substantially adhering to dip tube 128 and isolation tube 130.

Water bath 134 includes bath water 142, wherein although water 142 is described herein as the fluid used to quench syngas 110 and/or particulates 112, any suitable non-reactive fluid may be used for quenching. In the exemplary embodiment, quench ring 129 and/or quench spray devices (not shown) are situated at an upstream end 150 of dip tube 128, and are used to wet and cool an inner wall 174 of dip tube 128, as well as facilitate cooling and scrubbing of syngas 110 and particulates 112. Dip tube 128 defines a second inner diameter $ID_2$.

To facilitate mitigating deposition of molten particulates 112 on dip tube 128 due to direct contact of relatively hot particulates 112 with dip tube 128, $ID_2$ is greater than $ID_1$.

That is, dip tube 128, as well as quench ring 129 and/or the quench spray devices (not shown), are preferably somewhat recessed relative to downstream end 124 of lower wall 118. Quench ring 129 and/or quench spray devices may be in any number, orientation, and/or design that facilitates the operation of the syngas cooler 100 as provided herein. In an alternative embodiment, syngas cooler 100 has no quench ring 129 and/or quench spray devices situated at the upstream end 150 of dip tube 128. Also, alternatively, quench ring 129 is a gas quench manifold with at least one gas outlet (not shown) that is configured to channel cooling gas into primary zone 144. Further, in alternative embodiments, any means for quenching, scrubbing and cooling syngas 110, cooling and flushing radially interior portions of dip tube 128, and cooling and flushing other components in quench chamber 116 are provided.

Dip tube 128, quench ring 129, and isolation tube 130 each have a substantially circular cross-section. In other embodiments, tubes 128 and/or 130, and/or quench ring 129 have any cross-sectional shape that facilitates operation of cooler 100 as described herein. In the exemplary embodiment, dip tube 128, quench ring 129, and isolation tube 130 are substantially concentrically aligned with centerline 106. More specifically, dip tube 128 has a dip tube radius $R_2$ and isolation tube 130 has an isolation tube radius $R_3$, wherein in the exemplary embodiment, radius $R_2$ is less than radius $R_3$, and radius $R_3$ is less than radius $R_1$. As such, a primary quench zone 144 is defined within dip tube 128, a first substantially annular passage 146 is defined between dip tube 128 and isolation tube 130, and a second substantially annular passage 148 is defined between isolation tube 130 and shell 102.

Moreover, in the exemplary embodiment, upstream end 150 of dip tube 128 is coupled proximate to an upstream end 151 of splash plate 132, an upstream end 152 of isolation tube 130 is coupled proximate to a downstream end 153 of splash plate 132, and a downstream end 154 of dip tube 128 is positioned upstream from a downstream end 156 of isolation tube 130. Each upstream end 150 and 151 is positioned proximate to lower wall 118. Specifically, in the exemplary embodiment, each upstream end 150 and 151 is positioned proximate to downstream end 124 of lower wall 118. Downstream end 154 of dip tube 128 extends into water bath 134, thereby facilitating quenching and scrubbing of syngas 110 and particulates 112 exiting downstream end 154 by water 142.

Downstream end 156 of isolation tube 130 also extends into water bath 134, thereby forming a dynamic pressure seal (discussed further below) between annular passage 146 and annular passage 148. In the exemplary embodiment, downstream end 154 of dip tube 128 is serrated to help distribute syngas 110 as it enters into water bath 134 beneath dip tube 128. Similarly, in the exemplary embodiment, downstream end 156 of isolation tube 130 is serrated to help distribute a purge gas 190 (discussed further below) and/or syngas 110 to flow within water bath 134, between annular passage 146 and annular passage 148. In an alternative embodiment, downstream ends 154 and/or 156 of tubes 128 and/or 130, respectively, may have any suitable shape that facilitates operation of cooler 100 as described herein.

In the exemplary embodiment, isolation tube 130 includes at least one purge vent 147 defined in an outer wall 149 of isolation tube 130. Purge vent 147 is upstream of water bath 134, is selectively operable, and has a downward-pointing orientation in passage 148 to facilitate channeling syngas 110 downward during backflow conditions as described further below. For example, when purge vent 147 is open during normal operations, purge gas 190 flows through purge vent 147 from passage 148 through isolation tube 130 into passage 146, as will be described in more detail below.

As described herein, purge gas 190 is a non-reactive gas that includes, but is not limited to, inert nitrogen gas ($N_2$) or carbon monoxide (CO). Such non-reactive gases are typically not associated with adverse reactions with the predetermined materials used to manufacture cooler 100 and the processes defined herein, wherein such adverse reactions include, but are not limited to, accelerated corrosion. Also, as described here, "selectively operable" is defined as modulated by intrinsic mechanical properties and characteristics, an automated electronic control system (not shown) or manual operator-assisted devices (not shown). Alternatively, vents 147 include fixed openings wherein purge gas 190 flow through vents 147 is substantially exclusively controlled by differential pressure between passages 148 and 146.

A predetermined rate of flow of purge gas 190 into isolation tube 130 at a predetermined pressure substantially mitigates syngas 110, moisture, and particulates 112 entering into passage 148 from water 142. Consequently, purge vents 147 are sized to facilitate a continuous flow of purge gas 190 from annular passage 148 to annular passage 146 that facilitates removal of contaminants from between heat transfer wall 104 and lower wall 118, and shell 102, at pressure differentials well within the operating range of differential pressures across heat transfer wall 104, lower wall 118, and isolation tube 130. Although only two purge vents 147 are illustrated, it should be understood isolation tube 130 may include any number of purge vents 147. In an alternative embodiment, at least one purge vent 147 is defined within wall 149. In another alternative embodiment, at least one purge vent 147 has a fixed opening. In a further alternative embodiment, isolation tube 130 does not include any purge vents 147.

Vents 147 operate in cooperation with annular passage 148 to maintain a small, but acceptable differential pressure radially across isolation tube 130, wherein purge gas 190 is continuously purging the passage 148 between heat transfer wall 104 and shell 102. Such purging facilitates use of lower-temperature, less corrosion-resistant, and less expensive alloys and mitigates a potential for syngas 110 to enter passage 148. Vents 147 are operable such that purge gas 190 pressure in annular passage 148 is consistently maintained within a narrow sliding pressure band, thereby mitigating pressure cycling and facilitating maintenance of a comfortable margin from predetermined pressure and differential pressure limits. Moreover, in embodiments wherein reverse flow conditions, that is, flow of syngas 110 from passage 146 into passage 148, are permitted, containment of such syngas 110 flow within predetermined parameters can be facilitated by vents 147.

In the exemplary embodiment, vents 147 are modulated based upon primary variables that include, but are not limited to, predetermined differential pressure values across vent 147. Moreover, such selective operation is associated with predetermined operational conditions that include, but are not limited to, startup and shutdown and/or pressurization and depressurization of gasifier 16 (shown in FIG. 1).

In an alternative embodiment, vent spray devices (not shown) are positioned proximate to vents 147. Such devices spray water and/or additives in a pattern that facilitates a reduction in fouling and plugging of vents 147 and are selectively operable as described above. Specifically, such devices are in operation continuously or are modulated intermittently based upon primary variables that include, but are not limited to, differential pressure across vent 147 approaching a predetermined value wherein syngas 110 is likely to flow through vent 147 rather than purge gas 190. Moreover, such selective operation is associated with predetermined operational conditions that include, but are not limited to, startup and/or pressurization of gasifier 16 (shown in FIG. 1), wherein predetermined syngas 110 flows through vent 147 are anticipated and facilitated. Furthermore, such selective operation may be based on predetermined temporal parameters, for example, but not limited to, a five-minute spray period once every hour.

Moreover, in the exemplary embodiment, annular passages 148 are coupled in flow communication with a purge gas supply system (not shown) that facilitates operation of cooler 100 as described herein by modulating overall purge gas 190 flow into cooler 100 using selectively-operable mechanisms as described herein. That is, purge gas 190 flow and pressure may be increased during operation modes such as startup and cooler 100 pressurization, or in response to changing conditions within cooler 100 such as changes in differential pressure across isolation tube 130. Such supply system operates in cooperation with vents 147 to mitigate a potential for syngas 110 to enter a region of passage 148 between wall 104 and shell 102.

Furthermore, cooler 100 includes sufficient instrumentation to monitor predetermined differential pressures and flow rates associated with purge gas 190 and syngas 110. Such instrumentation includes, but is not limited to, vent 147 and wall 104 differential pressure (d/p) cells (not shown) that penetrate respective and proximate walls, as well as associated transmitters (not shown) coupled in data communication with the d/p cells.

In the exemplary embodiment, cooler 100 also includes at least one baffle tray 155 extending from an inner wall 157 of shell 102. Baffle tray 155 facilitates eliminating non-evaporated entrained water droplets and particulate material 112 along inner wall 157. Specifically, in the exemplary embodiment, baffle tray 155 has a substantially V-shaped cross-sectional shape with a first portion 159 coupled to inner wall 157 and a second portion 165 extending from first portion 159 at an angle θ. Furthermore, in the exemplary embodiment baffle tray 155 includes collection and drainage means (not shown) that substantially reduce the re-entrainment of any captured water and particulate material 112. Alternatively, baffle tray 155 has any cross-sectional shape that facilitates operation of cooler 100 as described herein. Moreover, in some embodiments, baffle tray 155 is fabricated from any material that facilitates preventing syngas 110, water 142 and particulate material 112 from substantially adhering to baffle tray 155. Any number of baffle trays 155 positioned anywhere within cooler 100 that facilitate operation of cooler 100 as described herein are used.

In an alternative embodiment, baffle tray spray devices (not shown) are positioned proximate to baffle tray 155. Such devices spray water and/or additives in a pattern that facilitates a reduction in fouling and plugging of baffle tray 155 and are selectively operable as described above. Specifically, such spray devices are in operation continuously or are modulated intermittently based upon primary variables that include, but are not limited to, differential pressure across baffle plate 155 approaching a predetermined value wherein flow of purge gas 190 downward through passage 148 is diminished such that syngas 110 is likely to flow through vent 147 rather than purge gas 190. Moreover, such selective operation is associated with predetermined operational conditions that include, but are not limited to, startup and/or pressurization of gasifier 16 (shown in FIG. 1), wherein increased particulate flow 112 is anticipated. Furthermore, such selective operation may be based on predetermined temporal parameters, for example, but not limited to, a five-minute spray period once every hour.

A third passage 160 is defined between splash plate 132 and shell 102. Splash plate 132 facilitates retaining syngas 110 and water 142 within isolation tube 130. In the exemplary embodiment, splash plate 132 is generally annular and extends between upstream end 151 and downstream end 153. In the exemplary embodiment, downstream end 153 of splash plate 132 is coupled proximate to upstream end 152 of isolation tube 130 and/or to heat exchange wall downstream end 126.

In the exemplary embodiment, splash plate 132 is generally frusto-conical. Specifically, in the exemplary embodiment, upstream end 151 of splash plate 132 has radius $R_2$ (as described above) and downstream end 153 of splash plate 132 has radius $R_3$ (as described above) that is larger than radius $R_2$. More specifically, in the exemplary embodiment, splash plate 132 diverges from upstream end 151 towards downstream end 153 such that plate 132 is at least partially conical. Alternatively, splash plate 132 may have any shape that facilitates operation of cooler 100 as described herein. Moreover, splash plate 132 is fabricated from any material that facilitates preventing syngas 110, water 142, and particulate material 112 from substantially adhering to splash plate 132. As such, splash plate 132 facilitates preventing accumulation of particulates 112 in syngas 110 as well as knockout of non-evaporated entrained water droplets, such that particulates 112 and water droplets (not shown) fall into water bath 134 after contacting splash plate 132.

At least one syngas outlet 140 is defined between splash plate 132 and shell 102 such that syngas outlet 140 is in flow communication with third passage 160. Outlet 140 channels syngas 110 from isolation tube 130 to a component outside of shell 102. As shown in FIG. 2, cooler 100 includes two outlets 140 extending from within isolation tube 130 through splash plate 132 and through shell 102. Although only two outlets 140 are shown in FIG. 2, alternatively, cooler 100 may include any number of outlets 140 that facilitate operation of cooler 100 as described herein.

In the exemplary embodiment, each outlet 140 is a cylindrical tube that has a generally arcuate cross-sectional profile extending between a first end 162 and a second end 164. Alternatively, outlet 140 may have any shape that facilitates operation of cooler 100 as described herein. Specifically, in the exemplary embodiment, outlet 140 extends from first end 162, positioned within isolation tube 130 near upstream end 152, through splash plate 132, and through shell 102. In the exemplary embodiment, outlet second end 164 may be coupled to cleanup device 32 (shown in FIG. 1), gas turbine engine 20 (shown in FIG. 1), and/or any other suitable component that facilitates operation of system 10 and cooler 100 as described herein.

In the exemplary embodiment, a plurality of seals 166 are positioned between splash plate 132 and outlet 140 to facilitate coupling plate 132 and outlet 140 together without leakage. Specifically, seals 166 are each positioned along an intersection 141 defined between plate 132 and outlet 140 to facilitate preventing leakage of syngas 110 and/or water 142 through intersection 141 of plate 132 and outlet 140. Seals 166 extend circumferentially about outlet 140. In the exemplary embodiment, seals 166 are water seals. Alternatively, seals 166 may be floating collar seals or any other seals that facilitate operation of cooler 100 as described herein. Also, alternatively, seals 166 have bellows-type devices (not shown). Further, alternatively, cooler 100 has any thermal expansion mechanism that mitigates deleterious thermal expansion effects between shell 102, outlets 140, plate 132, and isolation tube 130. Moreover, alternatively, thermal expansion effects within cooler 100 may be mitigated by methods that include, but are not limited to, use of a slip joint or a bellows-type mechanism between lower wall 118 and splash plate 132, as well as material selection for lower wall 118 and plate 132.

In an alternative embodiment, seal spray devices (not shown) are positioned proximate to seals 166. Such devices spray water and/or additives in a pattern that facilitates a reduction in particulate buildup and fouling of seals 166 and are selectively operable as described above. Specifically, such spray devices are in operation continuously or are modulated intermittently based upon primary variables that include, but are not limited to, differential pressure across seals 166 within passage 148 approaching a predetermined value wherein flow of purge gas 190 downward through passage 148 is diminished such that syngas 110 is likely to flow through vent 147 rather than purge gas 190. Moreover, such selective operation is associated with predetermined operational conditions that include, but are not limited to, startup and/or pressurization of gasifier 16 (shown in FIG. 1), wherein increased particulate flow 112 is anticipated. Furthermore, such selective operation may be based on predetermined temporal parameters, for example, but not limited to, a five-minute spray period once every hour.

In another alternative embodiment, there are no seals 166, and the outlet of splash plate 132 and inlet of outlet 140 are adjacent to, or overlap, one another. Moreover, alternatively, splash plate 132 and outlet 140 can be arranged in any manner that facilitates operation of syngas cooler 100 as described herein. The seal spray devices described above may still be employed in this embodiment to mitigate particulate buildup.

In a further alternative embodiment, a gap (not shown) is defined between the outlet of splash plate 132 and inlet of outlet 140, wherein the gap is sized to allow for free differential thermal growth between splash plate 132 and outlet 140. Furthermore, in this alternative embodiment, the gap is sized to provide an equivalent fixed orifice through which purge gas 190 can pass, instead of, or in addition to, one or more fixed opening vents 147.

In this alternative embodiment, gap spray devices (not shown) are positioned proximate to the gap defined between the outlet of splash plate 132 and inlet of outlet 140. Such devices spray water and/or additives in a pattern that facilitates a reduction in particulate buildup and fouling of the gap and are selectively operable as described above. Specifically, such spray devices are in operation continuously or are modulated intermittently based upon primary variables that include, but are not limited to, differential pressure across the gap between passage 148 and passage 146 approaching a predetermined value wherein flow of purge gas 190 through the gap is diminished such that syngas 110 is likely to flow through the gap rather than purge gas 190. Moreover, such selective operation is associated with predetermined operational conditions that include, but are not limited to, startup and/or pressurization of gasifier 16 (shown in FIG. 1), wherein increased particulate flow 112 is anticipated. Furthermore, such selective operation may be based on predetermined temporal parameters, for example, but not limited to, a five-minute spray period once every hour.

In the exemplary embodiment, each outlet 140 includes at least one spray injector 173 coupled thereto that channels a spray fluid stream 177 into outlet 140. Specifically, each spray injector 173 is coupled to an inner surface 175 of outlet 140. Alternatively, each spray injector 173 is coupled to any surface that facilitates operation of cooler 100 as described herein. Moreover, in the exemplary embodiment, spray injector 173 is coupled within outlet 140 such that flow discharged therefrom is discharged longitudinally downward substantially in diametric opposition against the longitudinally upward flow of syngas 110 into outlet 140. Alternatively, at least one spray injector 173 is oriented to discharge fluid stream 177 in a direction that is at least partially oblique to at least a portion of syngas 110 flow within outlet 140. Also, alternatively, at least one spray injector 173 is oriented to discharge fluid stream 177 in a direction that is substantially parallel to and coincident with at least a portion of syngas 110 flow within outlet 140. Further, alternatively, at least one spray injector 173 is oriented in any direction that facilitates operation of syngas cooler 100 as described herein. Moreover, alternatively, injector 173 is a gas injector that forms a gas quenching stream 177.

Moreover, each spray injector 173 is selectively operable as described above. Typically, in the exemplary embodiment, spray injector 173 is in continuous operation with substantially constant flow rates. Under some conditions, fluid flow rates may be modulated as a function of a mode of operation. Alternatively, any periodicity of spray operation with any fluid flow rates that facilitate operation of cooler 100 as described herein are used. When each spray injector 173 is in operation, spray injector 173 injects fluid spray stream 177 as described above. Spray injector 173 and spray stream 177 facilitate eliminating non-evaporated entrained water droplets, and substantially reduces and/or prevents accumulation of particulates 112, and/or water 142 from along walls and/or surfaces of components within cooler 100 that include, but are not limited to, an outer surface 178 of dip tube 128, an inner surface 180 of isolation tube 130, and at least a portion of surface 175 of outlet 140.

Furthermore, spray injector 173 and stream 177 facilitate further cooling of syngas 100. Moreover, spray injector 173 and spray stream 177 may be adjusted to mitigate accumulation and agglomeration of particulates 112 within water bath 134 and sump 136. As such, with less accumulation on walls and/or surfaces of components within cooler 100, as well as less agglomeration in water 142, less plugging and/or fouling of such components occurs. Outlet 140 includes any number of spray injectors 173 that enables cooler 100 to function as described herein. In an alternative embodiment, outlet 140 does not include any spray injectors 173. In a still further alternative embodiment, at least one spray injector 173 is coupled to splash plate 132, isolation tube 130, and/or any suitable component of cooler 100 that facilitates operation of cooler 100 as described herein.

As described above, fluid 177 discharged from spray injector 173 may flow downstream into water bath 134. In the exemplary embodiment, water bath 134 includes water 142, sump 136, and blowdown line 138. Water bath 134 forms a portion of quench chamber 116 that is configured to retain water 142 therein. Although water bath 134 is shown and described as having water 142 contained therein, water bath 134 may include suitable fluids other than water 142 and still be considered to be a "water bath." Moreover, spray injectors 173 are coupled in flow communication with a fluid source (not shown), wherein such fluid that forms spray streams 177 is compatible with the fluids within water bath 134 and streams 177 mix within water 142 such that water 142 is considered to include fluids from streams 177, if any.

In the exemplary embodiment, during normal operation, the flowing syngas 110 being channeled downward within dip tube 128 exerts pressure on water 142 such that a water level $L_1$ in quench zone 144 is substantially adjacent to downstream end 154 of dip tube 128. Furthermore, dip tube 128 and isolation tube 128 are each at least partially submerged in water 142 within water bath 134. As such, water 142 at least partially fills first and second passages 146 and 148, respectively. Also, in the exemplary embodiment, because of pressure differences within quench chamber 116 during normal operation, a level $L_2$ of water 142 within first passage 146 is higher than a level $L_3$ of water 142 within second passage 148. Alternatively, levels $L_2$ and $L_3$ are substantially similar. Further, alternatively, water 142 levels $L_1$, $L_2$, and $L_3$ have any value that facilitates operation of cooler 1000 as described herein. Downstream from dip and isolation tube ends 154 and 156, respectively, sump 136 is defined within water bath 134. More specifically, sump 136 may include a collection cone (not shown) coupled within shell 102 and a cylindrical sump outlet 170 that extends through shell bottom 114. Water 142 levels $L_1$, $L_2$, and $L_3$ are referenced to bottom of cooler 114 at sump outlet 170 and are measured via any type of level sensors that facilitate monitoring and controlling such levels as described herein. In the exemplary embodiment, cylindrical sump outlet 170 has a radius $R_4$ that is shorter than cooler shell radius $R_1$. Sump outlet 170 may be coupled to a slag crusher (not shown), a lock hopper (not shown), a pump (not shown), and/or any other wet particulate handling and/or removal device that facilitates operation of system 10 as described herein.

Also, in the exemplary embodiment, blowdown line 138 extends from water bath 134 through shell 102, and is configured to regulate the volume of water 142 within water bath 134. The water (not shown) that is blown down through blowdown line 138 is normally sent to a process water handling system (not shown) that enables the beneficial reuse of at least some of the blown down water. However, the blown down water may be sent to any suitable component, system, and/or location that facilitates operation of system 10 as described herein.

During system operation, syngas 110 with particulates 112 is channeled from gasifier 16 to cooler 100. Syngas 110 flows through the heat exchange devices within cooler 100 and into quench chamber 116. More specifically, lower wall 118 of cooler 100 channels syngas 110 with particulates 112 into primary quench zone 144, wherein syngas 110 flows past downstream end 124 of lower wall 118 and along inner wall 174 of dip tube 128, into water bath 134. Plugging of dip tube 128 is mitigated by the combined effects associated with the recessed position of inner wall 174 relative to downstream end 124 of lower wall 118, the relatively lower temperature of wall 174 as compared to particulates 112, which is partially cooled by water 142 external to dip tube 128, and relatively high momentums of the larger molten particles as contrasted with relatively lower momentums of the smaller cooler particles. Moreover, in the exemplary embodiment, quench ring 129 and/or quench spray devices wet and cool inner wall 174 of dip tube 128, as well as facilitate cooling and scrubbing of syngas 110 and particulates 112.

Particulates 112 that are solidified are referred to herein as solidified slag 176. Solidified slag 176 is formed after falling through primary quench zone 144 into water bath 134 and is discharged from cooler 100 through sump 136 via sump outlet 170. Syngas 110 and remaining particulates 112 rise up through passage 146 where syngas 110 is scrubbed further by one or more sprays 177, causing additional particulates 112 to fall and be captured in water bath 134, while syngas 110 and any remaining particles 112 exit syngas cooler 100 through one or more nozzles 140. In the exemplary embodiment, syngas 110 and/or, particulates 112 exiting water bath 134 are at a reduced temperature relative to syngas 110 and/or particulates 112 entering water bath 134.

Scrubbed syngas 110, which is substantially without particulate 112 and/or entrained water 142, is channeled from first passage 146 through outlet 140 for use within system 10.

In the exemplary embodiment, spray injector 173 sprays syngas 110 with fluid spray 177 before syngas 110 is channeled through outlet 140. As such, the fluid from spray injector 173 facilitates preventing accumulation of particulates 112 on surface 175 of outlet 140 and also facilitates preventing plugging of isolation tube 130, and/or outlet 140. Moreover, fluid spray 177 facilitates any further separation of particulates 112 from syngas 110 and any further cooling of syngas 110.

In the exemplary embodiment, under normal operating conditions, wherein level $L_3$ is less than level $L_2$, a flow of purge gas 190 may be channeled through cooler 100. Specifically, purge gas 190 is channeled downstream through passage 148. When purge vent 147 is in an open position, purge gas 190 is channeled through purge vent 147 into isolation tube 130. Specifically, purge gas 190 is channeled upstream of water bath 134. Purge gas 190 facilitates mitigating entry of syngas 110, moisture, and particulates 112 within sump 136 from flowing upstream into passage 148. In contrast, when purge vent 147 is in a closed position, purge gas 190 remains within passage 148.

Also, in the exemplary embodiment, under backflow conditions, wherein level $L_3$ is greater than level $L_2$, a flow of syngas 110 with particulates 112 are channeled through purge vent 147 into passage 148. Under such conditions, particulate matter 112 and entrained water droplets are removed from syngas 110 in a particle dropout zone (not shown) between vent 147 and baffle tray 155 while syngas 110 is directed towards water bath 134. Here, under backflow conditions, baffle tray 155 mitigates upward channeling of sump water 142 and entrained solids into passage 148. The optional vent spray devices may be employed to mitigate plugging vents 147 via particulate matter 112 buildup. Moreover, similarly the optional baffle tray spray devices may also be employed. Use of vents 147 as described herein facilitates reducing a magnitude of differential pressure transients within cooler 100.

In the exemplary embodiment, cooler 100 includes a dynamic pressure seal 199 reproducibly formed between annular passage 146 and annular passage 148 by the interaction of water 142 in water bath 134 with downstream end 156 of isolation tube 130. Seal 199 is defined herein as "fully engaged" when levels $L_2$ and $L_3$ are higher then the downstream end 156 of isolation tube 130. That is, purge gas 190 and syngas 110 both are prevented from flowing between annular passages 146 (having level $L_2$) and 148 (having level $L_3$) under downstream end 156 of isolation tube 130 via water 142 contained in water bath 134. Therefore, when dynamic seal 199 is fully engaged, the difference in height between levels $L_2$ and $L_3$ are directly related to the differential pressure across isolation tube 130 between annular passages 146 and 148. Specifically, for one example, when pressure within annular passage 148 increases (for example, due to an increase in purge gas 190 supply pressure), level $L_3$ within passage 148 will tend to decrease. If the pressure within annular passage 146 and the volume of water 142 in bath 134 are held substantially constant during the aforementioned passage 148 pressure transient, level $L_2$ within passage 146 will tend to increase. A decrease in pressure within passage 146 with a substantially constant pressure within passage 148 will provide a similar result. Moreover, similarly, an increase in pressure within passage 146 with substantially constant pressure within passage 148 will tend to decrease level $L_2$ and increase level $L_3$. A decrease in pressure within passage 148 with a substantially constant pressure within passage 146 will provide a similar result. Therefore, when dynamic seal 199 is fully engaged, differential pressure between passages 146 and 148 is directly related to a differential between levels $L_2$ and $L_3$.

Seal 199 is defined herein as "partially engaged" when one of levels $L_2$ and $L_3$ is adjacent to bottom end 156 of isolation tube 130 and the other of levels $L_2$ and $L_3$ is higher than bottom end 156 of isolation tube 130. In this condition, dynamic pressure seal 199 operates substantially as a one-way seal in a manner similar to that of a selectively-operated check valve. That is, flow of syngas 110 underneath bottom end 156 of isolation tube 130 is substantially reduced when $L_2$ is above the bottom end 156 of isolation tube 130. Specifically, a degree of flow reduction, up to and including flow prevention, under bottom end 156 of purge gas 190 and syngas 110 are substantially dependent upon values for levels $L_2$ and $L_3$, and pressures of purge gas 190 and syngas 110. More specifically, syngas 110 flow reduction is conditioned upon the combined sealing action of a liquid head of water 142 formed between bottom end 156 and level $L_2$, and the pressure of purge gas 190 in annular passage 148. Similarly, flow of purge gas 190 underneath bottom end 156 of isolation tube 130 is substantially reduced when $L_3$ is above bottom end 156 of isolation tube 130. Such purge gas 190 flow is conditioned upon the combined sealing action of a liquid head of water 142 between bottom end 156 and level $L_3$ and the pressure of syngas 110.

Seal 199 is defined herein as "disengaged" when both levels $L_2$ and $L_3$ are downstream of, or below, bottom end 156 of isolation tube 130. When disengaged, syngas 110 and purge gas 190 are free to flow underneath bottom end 156 of isolation tube 130, wherein predetermined values of flow and mixing are substantially based on, and primarily controlled by, the size and geometry of the gap between liquid levels $L_2$ and $L_3$ and bottom end 156, as well as flow rates, pressures, molecular weights and temperatures of syngas 110 and purge gas 190.

When seal 199 is engaged or partially engaged (both conditions as defined above) the pressure drop across isolation tube 130, that is, the difference in pressure between the pressures in annular passages 146 and 148, is approximately equal to the difference in effective liquid head between levels $L_3$ and $L_2$. After taking into account fluid flow effects, such as the pressure drop that occurs through quench zone 144, the pressure drops across heat transfer wall 104 and the pressure difference between section 120 and third passage 160 are similarly related to the difference in effective liquid head between $L_3$ and $L_2$. Consequently, seal 199 can be selectively designed and operated to provide pressure equalization means across heat transfer wall 104, lower wall 118 and isolation tube 130, thereby providing a form of overpressure protection. Furthermore, the responsiveness and magnitude of the overpressure protection can be adjusted by modifying the volume of water 142 in water bath 134 and the flow rate of purge gas 190. Moreover, seal 199 readily transitions between fully engaged, partially engaged, and disengaged in response to such pressure drop conditions, and thereby serves as a dynamic pressure seal that can provide long-term protection.

Incorporation of purge vents 147 as described above facilitates flow of syngas 110 and purge gas 190 above levels $L_2$ and $L_3$, and therefore provides means to facilitate gas flow through isolation tube 130 at lower differential pressures than would otherwise be required. Consequently, inclusion of purge vents 147 facilitates reducing a number of occurrences wherein seal 199 is either partially engaged or disengaged, hence reducing variations in pressure drops across heat transfer wall 104, lower wall 118 and isolation tube 130.

Although the foregoing has been described where syngas 110 passes from annular passage 146 to annular passage 148, and purge gas 190 passes from annular passage 148 to annular passage 146, it should be understood that the gas in annular passages 146 and 148 may contain mixtures of syngas 110 and purge gas 190 as a normal consequence of such operation.

Operation of such seal 199 is facilitated by integrated control of variables that include purge gas 190 pressures and flow rates through passage 148 into passage 146 via vents 147 and/or under isolation tube 130. Additional variables include pressures, temperatures, and compositions of syngas 110 and particulates 112 in heat exchange section 120 and primary quench zone 144, flow rates and temperatures of streams 177 entering primary quench zone 144, as well as levels $L_1$, $L_2$, and $L_3$ via blowdown line 138 and the fluid makeup line (not shown). Dynamic pressure seal 199 modulates as a function of the variables described above to provide overpressure protection, thus facilitating the efficient and effective syngas 110 scrubbing and cooling as described further herein.

An exemplary method of assembling syngas cooler 100 for gasification system 10 is provided. The method includes positioning dip tube 128 within shell 102 of syngas cooler 100. Dip tube 128 is configured to at least partially quench a portion of syngas 110 flowing through shell 102 and/or channel at least a portion of syngas 110 through dip tube 128. The method also includes coupling isolation tube 130 to dip tube 128 such that isolation tube 130 is substantially concentrically aligned with, and radially outward of, dip tube 128. Isolation tube 130 is coupled in flow communication with a source of purge gas 190 and is configured to at least partially form dynamic pressure seal 199. The method further includes coupling at least one of isolation tube 130 and dip tube 128 in fluid communication with fluid retention chamber, or water bath 134. The method also includes at least partially filling the water bath 134 with fluid 142, thereby further forming dynamic pressure seal 199.

Furthermore, under conditions wherein vents 147 do not have capacity to sufficiently channel purge gas 190 and/or syngas 110 into passages 146 and/or 148, respectively, or under conditions wherein differential conditions within cooler 100 are such that either $L_3$ or $L_2$ are adjacent to bottom end 156, a flow of purge gas 190 and/or syngas 110 and particulates 112 may be channeled through a portion of water bath 134 under bottom end 156. Such configuration facilitates pressure protection, that is, differential pressure control, regardless of flow-inhibiting factors.

In alternative embodiments that do not include vents 147, under normal operating conditions, wherein level $L_3$ is less than level $L_2$ and level $L_3$ is substantially adjacent to downstream end 156, a flow of purge gas 190 may be channeled downstream through passage 148 into isolation tube 130. Specifically, purge gas 190 is channeled through a portion of water bath 134 into passage 146 under end 156. Under backflow conditions, wherein level $L_3$ is greater than level $L_2$ and level $L_2$ is substantially adjacent to downstream end 156, a flow of syngas 110 and particulates 112 may be channeled through a portion of water bath 134 into passage 148 under end 156. Under such conditions, particulate matter 112 is removed from syngas 110 in a particle dropout zone (not shown) between level $L_3$ and baffle tray 155. Lack of vents 147 may facilitate an increase in the magnitude of differential pressure transients within cooler 100. However, such configuration facilitates pressure protection, that is, differential pressure control regardless of no vents 147.

Figure 3:
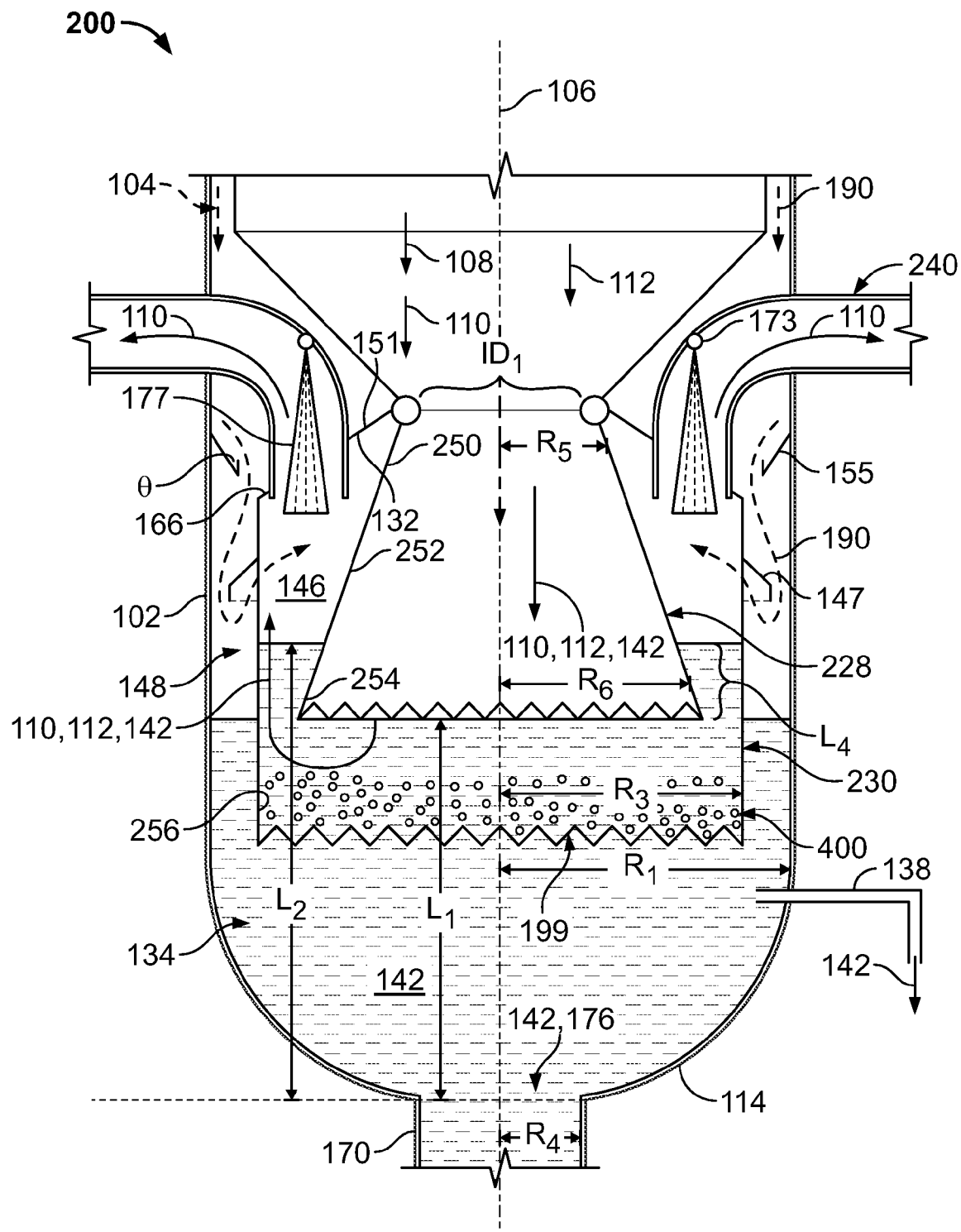
FIG. 3 is a schematic cross-sectional view of an alternative syngas cooler that may be used with the system shown in FIG. 1.

FIG. 3 is a schematic cross-sectional view of an alternative syngas cooler 200 that may be used with system 10 (shown in FIG. 1). Syngas cooler 200 includes at least one dip tube 228, at least one isolation tube 230, and at least one outlet 240. Cooler 200 is similar to cooler 100, and similar components are identified in FIG. 3 using the same reference numerals used in FIG. 2. More specifically, dip tube 228 is similar to dip tube 128 and identical components are identified with the same reference numerals used in FIG. 2, isolation tube 230 is similar to isolation tube 130 and identical components are identified with the same reference numerals used in FIG. 2, and outlet 240 is identical to outlet 140 and like components are identified with the same reference numerals used in FIG. 2.

In contrast to dip tube 128, dip tube 228 is frusto-conical. Specifically, as shown in FIG. 3, an upstream end 250 of dip tube 228 is coupled in close proximity to upstream end 151 of splash plate 132, and a downstream end 254 of dip tube 228 is upstream from downstream end 256 of isolation tube 230. Upstream end 250 defines a radius $R_5$ and downstream end 256 defines a radius $R_6$ that is larger than radius $R_5$ and smaller than radius $R_3$. As such, dip tube 228 diverges from upstream end 250 towards downstream end 254. The size of radius $R_6$ enables downstream end 254 to provide the same amount of quenching as downstream end 154, while shortening a distance $L_4$ dip tube 228 is submerged within water bath 134, wherein, $L_4$ is the difference between $L_1$ and $L_2$. Any means for quenching, scrubbing and cooling syngas 110, cooling and flushing radially interior portions of dip tube 228, and cooling and flushing other components in cooler 200 are provided.

Cooler 200 operates in a manner that is substantially similar to the operation of cooler 100.

Referring to FIGS. 2 and 3, alternate embodiments of isolation tubes 130 and 230 include a plurality of openings 300 and 400, respectively defined within downstream ends 156 and 256, respectively. Specifically, such openings 300 and 400 are defined at predetermined elevations about a circumferential portion of isolation tubes 130 and 230 defined by the difference between lengths $L_1$ and $L_2$ and radius $R_3$. Plurality of openings 300 and 400 facilitate a predetermined distribution of purge gas 190 through tubes 130 and 230 from passage 148 into passage 146 under normal operating conditions, wherein level $L_3$ is less than level $L_2$, and $L_3$ is at substantially the same level as one or more of the openings 300 and 400 through tubes 130 and 230, respectively.

Moreover, such openings 300 and 400 facilitate a predetermined distribution of syngas 110 through tubes 130 and 230 during backflow conditions, wherein level $L_3$ is greater than level $L_2$, and $L_2$ is at substantially the same level as one or more of the openings 300 and 400 through tubes 130 and 230, respectively. Under such conditions, particulate matter 112 is removed from syngas 110 in a particle dropout zone (not shown) between level $L_3$ and baffle tray 155. Use of openings 300 and 400 as described herein facilitates reducing a magnitude of differential pressure transients within coolers 100 and 200. Moreover, bypassing downstream portions 156 and 256 of isolation tubes 130 and 260, respectively, facilitates a more gradual equalization of pressure across tubes 130 and 230. Openings 300 and 400 may be used in addition to, or in lieu of, vents 147 and have any configuration that facilitates operation of syngas coolers 100 and 200 as described herein.

Referring to FIGS. 2 and 3, alternate embodiments of coolers 100 and 200 include operation with level $L_2$ below downstream ends 154 and 254 of dip tubes 128 and 228, respectively. However, such alternative embodiments also include operation with level $L_3$ above downstream ends 156 and 256 of isolation tubes 130 and 230, respectively. Such operation is referred to as "partial quenching", wherein flow of syngas 110 from dip tubes 128 and 228 receives little to no quenching via water 142 in bath 134. However, partial quenching of syngas 110 and partial cooling of dip tubes 128 and 228 may be facilitated with water or gas quenching from devices similar to quench ring 129 (shown in FIG. 2). Also, alternatively, similar quenching devices may be positioned within passage 146 prior to outlets 140 and 240 to facilitate quenching of syngas 110 prior to entry into outlets 140 and 240 as well as partial cooling of dip tubes 128 and 228, wherein such quenching and cooling operation may be performed in conjunction with spray injectors 173. Further alternatively, any configuration of quenching devices that facilitates operation of such alternative embodiments as described herein are used. Also, alternatively, any configuration of dip tube 128 and 228 cooling mechanisms that facilitates operation of such alternative embodiments as described herein are used, including, but not limited to, indirect cooling methods such as evaporative cooling of shell 102. Moreover, such alternative embodiments retain dynamic pressure seal 199, wherein such operation includes maintaining level $L_3$ above downstream ends 156 and 256 of isolation tubes 130 and 230, respectively.

Again, referring to FIGS. 2 and 3, alternate embodiments of coolers 100 and 200 include use of a draft tube (not shown) as is known in the art. Such alternative embodiments may also include draft tube cooling and syngas quenching as described herein.

The above-described radiant syngas cooler (RSC) reduces a temperature of a syngas and/or particulate flow. Specifically, the temperature of the syngas and/or particulates is reduced as the syngas is routed through a dip tube, an isolation tube, and an outlet. The outlet includes at least one spray injector therein that sprays the syngas with water before the syngas is channeled through the outlet. Spraying the syngas prior to channeling the syngas through the outlet facilitates preventing plugging and/or fouling of the radially outer surfaces of the dip tube, radially inner surfaces of the isolation tube, and the inner walls of the outlet. With less plugging and/or fouling of surfaces within the syngas cooler, the syngas cooler requires less maintenance, and the efficiency of the cooler is improved such that a convective syngas cooler (CSC) is not required. Moreover, suspended particulates and/or particles within the syngas flow and/or fly ash are separated and/or precipitated and/or quenched through contact with water. Particularly, the particulates and/or particles are cooled by contact with a water bath. Further, the above-described syngas cooler includes at least one splash plate, at least one spray injector, and at least one baffle tray that facilitate preventing and/or lessening non-evaporated entrained water droplets that accumulate on components of the syngas cooler during operation of the syngas cooler. Also, vents as described herein facilitate pressure control and differential pressure control within the cooler to maintain a margin to operational limits and to facilitate effective heat transfer and syngas scrubbing. Furthermore, formation and operation of a dynamic pressure seal within the RSC facilitates pressure and differential pressure protection of syngas cooler components and overall operation of the RSC to efficiently effect the aforementioned features and characteristics.

Exemplary embodiments of a syngas cooler are described above in detail. The syngas cooler is not limited to the specific embodiments described herein, but rather, components of each syngas cooler may be utilized independently and separately from other components described herein. Each syngas cooler may also be used in combination with other systems, and is not limited to practice with only the system described herein. Rather, the present invention can be implemented and utilized in connection with many other quenching applications. For example, each syngas cooler may be used not only with an IGCC power generation plant.

While the invention has been described in terms of various specific embodiments, those skilled in the art will recognize that the invention can be practiced with modification within the spirit and scope of the claims.

What is claimed is:

1. A method of assembling a synthesis gas (syngas) cooler for a gasification system, said method comprising:
    positioning a dip tube within a shell of the syngas cooler, wherein the dip tube includes an upstream end and a downstream end, the dip tube is configured to at least one of:
        at least partially quench at least a portion of the syngas flowing through the shell; and
        at least partially channel at least a portion of the syngas through the dip tube;
    coupling an isolation tube to the dip tube such that the isolation tube is substantially concentrically aligned with, and radially outward of, the dip tube, wherein the isolation tube includes an upstream end and a downstream end, the dip tube downstream end is positioned upstream from the isolation tube downstream end, and wherein the isolation tube is coupled in flow communication with a purge gas source and is configured to at least partially form a dynamic pressure seal;
    coupling at least one of the isolation tube and the dip tube in fluid communication with a fluid retention chamber; and
    at least partially filling the fluid retention chamber with fluid, thereby further forming the dynamic pressure seal.

2. A method in accordance with claim 1 further comprising:
    coupling at least one syngas outlet to the shell, wherein the outlet is configured to channel a portion of syngas from the isolation tube; and
    coupling at least one spray nozzle within the at least one syngas outlet.

3. A method in accordance with claim 1 further comprising defining at least one purge vent within the isolation tube.

4. A method in accordance with claim 1 further comprising defining a plurality of circumferential openings within at least a portion of the isolation tube.

5. A synthesis gas (syngas) cooler for use within a gasification system, said syngas cooler comprising:
    a shell;
    a dip tube positioned within said shell, said dip tube comprising an upstream end and a downstream end, said dip tube is configured to at least one of:
        at least partially quench at least a portion of a syngas flowing through said shell; and
        at least partially channel at least a portion of the syngas through said dip tube;
    an isolation tube comprising an upstream end and a downstream end, said isolation tube coupled to said dip tube such that said isolation tube is substantially concentrically aligned with, and radially outward of, said dip tube, wherein said dip tube downstream end is positioned upstream from said isolation tube downstream end, and wherein said isolation tube is coupled in flow communication with a purge gas source and is configured to at least partially form a dynamic pressure seal; and
    a fluid retention chamber coupled in flow communication with at least one of said isolation tube and said dip tube, wherein said fluid retention chamber is at least partially filled with fluid and is configured to further form said dynamic pressure seal.

6. A syngas cooler in accordance with claim 5 further comprising:
    at least one syngas outlet coupled to said shell, said syngas outlet configured to channel a portion of the syngas from said isolation tube; and
    at least one spray nozzle coupled to said at least one syngas outlet.

7. A syngas cooler in accordance with claim 6 wherein said at least one syngas outlet is positioned between said shell and at least one splash plate, wherein said at least one splash plate is coupled to said isolation tube.

8. A syngas cooler in accordance with claim 5 wherein at least one of said dip tube downstream end and said isolation tube downstream end is serrated.

9. A syngas cooler in accordance with claim 5 wherein said isolation tube downstream portion defines a plurality of circumferential openings.

10. A syngas cooler in accordance with claim 5 wherein said downstream end of said dip tube is one of:
    at least partially immersed within the fluid within said fluid retention chamber; and
    positioned upstream of the fluid within said fluid retention chamber.

11. A syngas cooler in accordance with claim 5 wherein said dip tube is one of a cylindrical and frusto-conical configuration.

12. A syngas cooler in accordance with claim 5 further comprising a syngas chamber defined upstream from said dip tube such that said syngas chamber is configured to channel syngas into said dip tube.

13. A syngas cooler in accordance with claim 5 further comprising at least one baffle tray coupled within said shell.

14. A syngas cooler in accordance with claim 5 further comprising at least one purge vent defined within said isolation tube, wherein said at least one purge vent is one of fixed opening and selectively operable configurations.

15. A syngas cooler in accordance with claim 5 further comprising at least one seal positioned between said syngas outlet and said isolation tube.

16. A syngas cooler in accordance with claim 5 further comprising at least one quenching mechanism.

17. A gasification system comprising:
    at least one gasifier configured to produce a synthesis gas (syngas); and
    at least one syngas cooler coupled in flow communication with said gasifier, said at least one syngas cooler comprising:
        a shell;
        a dip tube positioned within said shell, said dip tube comprising an upstream end and a downstream end, said dip tube is configured to at least one of:
            at least partially quench at least a portion of the syngas flowing through said shell; and at least partially channel at least a portion of the syngas through said dip tube;

an isolation tube comprising an upstream end and a downstream end, said isolation tube coupled to said dip tube such that said isolation tube is substantially concentrically aligned with, and radially outward of, said dip tube, wherein said dip tube downstream end is positioned upstream from said isolation tube downstream end, and wherein said isolation tube is coupled in flow communication with a purge gas source and is configured to at least partially form a dynamic pressure seal; and a fluid retention chamber coupled in flow communication with at least one of said isolation tube and said dip tube, wherein said fluid retention chamber is at least partially filled with fluid and is configured to further form said dynamic pressure seal.

18. A gasification system in accordance with claim 17 further comprising:

at least one syngas outlet coupled to said shell, said syngas outlet is configured to channel a portion of the syngas from said isolation tube; and at least one spray nozzle coupled to said at least one syngas outlet.

* * * * *